(12) United States Patent
Pinto

(10) Patent No.: US 6,593,566 B1
(45) Date of Patent: Jul. 15, 2003

(54) METHOD AND APPARATUS FOR PARTICLE ACCELERATION

(76) Inventor: Fabrizio Pinto, 639 W. Foothill Blvd., Monrovia, CA (US) 91016

( * ) Notice: Subject to any disclaimer, the term of this patent is extended or adjusted under 35 U.S.C. 154(b) by 0 days.

(21) Appl. No.: 09/578,639

(22) Filed: May 25, 2000

Related U.S. Application Data
(60) Provisional application No. 60/135,868, filed on May 25, 1999.

(51) Int. Cl.$^7$ .................................................. H05H 3/00
(52) U.S. Cl. .................... 250/251; 250/296; 315/111.61
(58) Field of Search ................................ 250/251, 296; 315/111.61

(56) References Cited

U.S. PATENT DOCUMENTS

| | | | | |
|---|---|---|---|---|
| 4,992,656 A | * | 2/1991 | Clauser | 250/251 |
| 5,861,701 A | | 1/1999 | Young et al. | 310/305 |

OTHER PUBLICATIONS

Anderson et al., "Measuring the van der Waals force between a Rydberg Atom and a metallic surface," Phys. Rev. A, 37(9) 3594–3597 (May, 1988).
Cheng et al., "Enhancement of the van der Waals energy between an atom and a cylindrical surface: Application to the edges of stepped surfaces," Phys. Rev. B, 41(2), 1196–1199 (Jan. 1990).
Casimir et al., "The Influence of Retardation on the London–van der Waals Forces," Phys. Rev., 73(4), 360–372 (Feb. 1948).
Cooke et al., "Effects of blackbody radiation on highly excited atoms," Phys. Rev. A, 21(2), 588–593 (Feb. 1980).
Dzyaloshinkii et al., "The General Theory of Van der Waals Forces," Advanc. Phys., vol. 10, 165–209 (1961).
Langbein, D., "Theory of Van der Waals Attraction," Springer Tracts in Modern Physics, vol. 72, 145 pages (Springer–Verlag, Berlin, 1974).
Laryushin et al., "Reflection cooling of sodium atoms in an evanescent light wave," Optics Comm., vol. 135, 138–148 (Feb. 1977).
Margenau et al., "The Forces Between Neutral Molecules and Metallic Surfaces," Phys. Rev., vol. 60, 128–134 (Jul. 1941).
Marvin et al., "van der Waals interaction between a point particle and a metallic surface. I. Theory," Phys. Rev. A, 25(2), 782–802 (Feb. 1982).
McLachlan, A.D., "Van der Waals forces between an atom and a surface," Proc. R. Soc., vol. 271, 381–387 (1963).
Mehl et al., "Theory of neutral atom scattering at long range from metal surfaces," Phys. Rev. A, 16(3), 921–926 (Sep. 1977).
Mehl et al., "Quantum Theory of neutral–atom scattering at long range from solid cylinders," Phys. Rev. A, 21(4) 1174–1184 (Apr. 1980).
Mehl et al., "The Van der Waals Interaction between and atom and a Solid," Surf. Sci. 99, 553–565 (1980).
Raskin et al., "Interaction between a Neutral Atomic or Molecular Beam and a Conducting Surface," Phys. Rev., 179(3), 712–721 (Mar. 1969).
Shih et al., "Investigation of the interaction potential between a neutral molecule and a conducting surface," Phys. Rev. A, 9(2), 652–662 (Feb. 1974).

(List continued on next page.)

Primary Examiner—John R. Lee
Assistant Examiner—Nikita Wells
(74) Attorney, Agent, or Firm—DeMont & Breyer, LLC

(57) ABSTRACT

A method and apparatus for accelerating and a decelerating particles based on particle surface interactions. In particular, in some embodiments, particles traveling away from a surface are made to travel at either a higher or lower speed than that with which they approached the surface. This change in velocity is effected by prompting the particles to undergo atomic transitions during their interaction with the surface.

28 Claims, 2 Drawing Sheets

OTHER PUBLICATIONS

Shih, A., "van der Waals forces between a Cs atom or a CsC1 molecule and metal or dielectric surfaces," Phys. Rev. A, 9(4), 1507–1514 (Apr. 1974).

Wylie et al., "Quantum electrodynamics near an interface," Phys. Rev. A, 30(3), 1185–1193 (Sep. 1984).

* cited by examiner

METHOD AND APPARATUS FOR PARTICLE ACCELERATION

STATEMENT OF RELATED APPLICATIONS

This application claims priority of Provisional Application No. 60/135,868 filed May 25, 1999. Moreover, this application is related to applicant's co-pending patent application entitled "Method and Apparatus for Energy Extraction," filed on May 25, 2000 as Ser. No. 09/578,638, now allowed, and incorporated herein by reference.

FIELD OF THE INVENTION

The present invention relates generally to accelerating or decelerating particles, such as, for example, atoms.

BACKGROUND OF THE INVENTION

It is a well-known result of non-relativistic quantum mechanics that two neutral atoms or molecules will attract each other because of their uncorrelated dipole-dipole interactions. In a related manner, a neutral atom will be attracted to a nearby perfectly conducting surface because of the interaction with its own image. The force between a neutral atom and a perfectly conducting parallel plane was first explained in the case of isomeric atoms by Lennard-Jones in non-relativistic perturbation theory and it is typically referred to as the van der Waals force.

When the distance between the atom and the surface becomes much larger than the typical wavelength of atomic transitions for that atom, Lennard-Jones' non-relativistic treatment of the force fails (as a consequence of the fact that the speed of light is not infinite). In fact, relativistic quantum mechanics is required for analysis of such a case. The relativistic analysis was first preformed by Casimir and Polder. In this regime, which is referred to as "retarded," the intensity of the force of attraction decreases more rapidly than in the van der Waals, or so-called "un-retarded" case.

Since all forces of this type depend on the optical (dielectric) properties of the materials involved, they are also referred to as "dispersion" forces. There is a connection between atom-surface forces and surface-surface forces. The former can be viewed as the limit of the latter when the second surface is an extremely rarified layer of neutral atoms. Consequently, surface-surface forces can be explained as simply a large-scale manifestation of the atom-surface force.

This understanding, which comprises the "source theory" of dispersion forces, is of relatively recent vintage. The first complete theory of surface-surface forces was given by Casimir in 1948 with the introduction of "zero point energy," with no mention of the Lennard-Jones potential.

Zero point energy or "vacuum energy" or "ZPE" is energy that is associated with a non-thermal radiation that is believed to be present everywhere in the universe—even in regions that are otherwise devoid of matter and thermal radiation. This non-thermal radiation is believed to result from random fluctuations occurring at the quantum level that result in a continual creation and destruction of virtual particles. This radiation is often referred to as a "zero point field," or by the acronym "ZPF," and the energy that is associated with the field is the aforementioned zero point energy. It is now understood that all dispersion forces, whether they be Casimir, Casimir-Polder, van der Waals, etc., are closely related to one another and can be explained by means of mutually exclusive, although equally acceptable, theories.

Until recently, there has been relatively little experimentation in the area of dispersion forces. In the case of surface-surface forces, this is due to the fact that the interacting boundaries must be highly polished and must be closer than about 1 micron for the forces to even approach measurability. The technology required for such experimentation was not available until recently.

Experimentation as to atom-surface forces, however, has not been quite as problematic. In particular, to measure atom-surface interactions, an atomic beam is directed near a conducting cylindrical surface and the deflection of the atoms from the surface due to van der Waals forces is measured. This "atomic deflection" approach, which is referred to as the Raskin-Kusch experiment, has been practiced for the last forty years to investigate van der Waals forces.

Investigators continue to use the techniques of the Raskin-Kusch experiment to probe van der Waals and other forces. Of late, experimentation is being performed with slow moving atoms that are obtainable using the relatively recent techniques of atomic trapping and cooling. Slower moving atoms are much more readily detected thereby facilitating more sensitive measurements.

SUMMARY OF THE INVENTION

Illustrative embodiments of the present invention provide methods and apparat uses by which a particle is accelerated or decelerated based on particle-surface interactions. In particular, in some embodiments, particles traveling away from a surface are made to travel at either a higher or lower speed than that with which they approached the surface. This change in velocity is effected by prompting the particles to undergo atomic transitions during their interaction with the surface.

In accordance with some embodiments of the present teachings, to accelerate a particle, such as an atom that is in its ground state, the particle is "excited" (i.e., transitions to a higher energy level) on its way to a close approach with a surface. In one embodiment, this excitation is accomplished using a laser. When the particle is at or near its closest approach to the surface, it is then advantageously prompted to return to its ground state.

During the approach to the surface in the excited state, the van der Waals force between the particle and the surface is quite high. After returning to the ground state, the van der Waals force between the particle and the surface is substantially reduced. This reduced attraction results in a significant increase in particle velocity.

To decelerate a particle, such as an atom in its ground state, the particle is excited, but that excitation occurs just after closest approach to the surface. Thus, the outbound particle, now in an excited state, experiences a much higher van der Waals force with the surface than when it was inbound toward the surface at the round state. This increased attraction significantly decreases particle velocity.

In some embodiments, an apparatus for carrying out the present methods comprises a particle source, a particle collimator, a particle exciter, a surface, and a particle de-exciter.

Underlying the present invention is the discovery that by prompting a particle to undergo an atomic transition during its interaction with the surface, its outgoing speed (i.e., speed as it moves away from a surface) can be changed relative to its incoming speed. The method is consistent with the conservation of energy principle.

The methods and apparatuses described herein are an improvement on the Raskin-Kusch experiment. The apparatus used in Raskin-Kusch experiments is similar to the present apparatus, but it does not include a particle exciter (or de-exciter). As a consequence, particles, such as atoms, are not prompted to undergo an atomic transition during their interaction with the surface.

Since the particles in Raskin-Kusch do not undergo an atomic transition during their interaction with the surface, they emerge from the interaction with the surface with a changed direction but with no change in speed. The constant speed is due to the fact th at the van der Waals force behave s as a conservative force. As such, when a particular atom is at a large distance from the surface, its speed is the same as it was on the incoming leg of the trajectory.

DETAILED DESCRIPTION OF THE INVENTION

Concepts such as the van der Waals force, the Casimir-Polder force, the Casimir force, the Bohr radius, the quantum number and the like will used herein without further definition or description due to their well-defined meanings and the familiarity of those skilled in the art with such concepts.

Illustrative embodiments of the present invention provide methods and apparatuses by which a particle is accelerated or decelerated. The illustrative methods and apparatuses utilize particle-surface interactions, but the invention is not limited thereto.

In most embodiments of the present invention, the particle that is accelerated will be quite small. Examples of small particles used in various embodiments, include, without limitation, neutral atoms, neutral molecules, and neutral elementary particles. But the present methods apply irrespective of size. For example, in some embodiments, microscale neutral specks of dust are accelerated/decelerated. And, on a much more macroscopic scale, a neutral ball one-foot in diameter is accelerated/decelerated in accordance with the present teachings. It will be understood, however, that the amount of acceleration/deceleration imparted to such macro-scale objects will be quite small compared to that imparted to atomic-sized particles. In general, the term "particle" includes all such sub-atomic-, atomic-, micro- and macro-scale objects.

The van der Waals and Casimir-Polder forces depend on the quantum state of the particle, for example, an atom, next to the surface of interest. In particular, van der Waals and Casimir-Polder forces are proportional to the second power of the Bohr radius of the atom. And, the Bohr radius is itself proportional to the second power of the principal quantum number, n, which describes in part the state of the atom. Therefore, van der Waals and Casimir-Polder forces are proportional to the fourth power of the principal quantum number:

$$\text{force } n^4 \qquad [1]$$

This dependence on the fourth power of n is an important ramification in the context of the present invention. Consider, for example, a "cold" particle, such as a cold atom. When cold, the particle is usually in its ground state, which, for an atom, corresponds to a principal quantum number n=1. Consider that atom in an excited state having, for example, a principal quantum number n=10. In such a case, the van der Waals force attracting the excited particle to the surface is, in accordance with expression [1], $10^4$ or 10,000 times greater than when the particle is in its ground state.

As used herein, the term "excite" or "excited" refers to a particle that, due to the introduction of energy, is at a higher energy level than its ground state. In the particular case of an atom, an excited atom will have a principal quantum number that is greater than 1.

Figure 1:
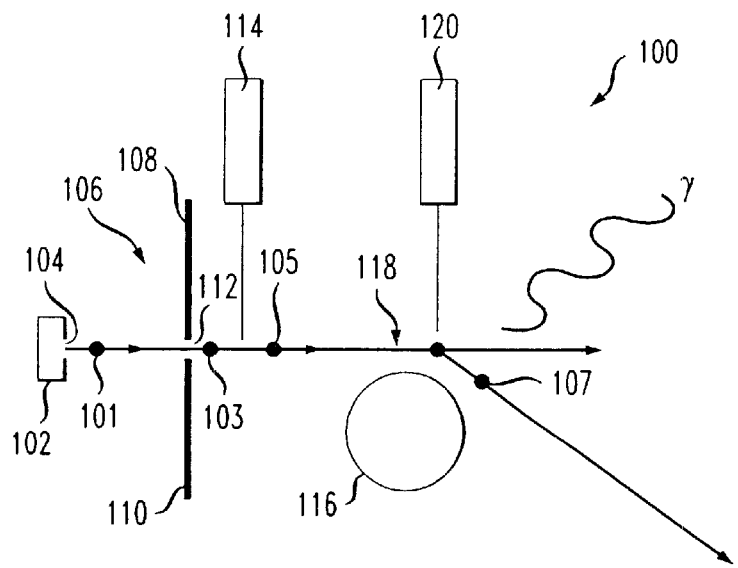
FIG. 1 depicts an illustrative embodiment of a particle accelerator in accordance with the present teachings.

FIG. 1 depicts an embodiment of a particle accelerator 100 in accordance with the illustrative embodiment of the present invention. Particle accelerator 100 comprises particle source 102, collimator 106, particle exciter 114, surface 116, and optional particle de-exciter 120, interrelated as shown.

Particle source 102 contains the particles that will be accelerated by accelerator 100. Particle source 102 can be embodied as any of a variety of well-known devices/systems, such as, without limitation, an oven containing a hot gas or an apparatus for atom trapping and cooling. In the illustrative embodiment, particle source 102 includes orifice 104 that allows at least some of the particles in particle source 102 to escape. In some embodiments, orifice 104 is a hole that is about 1 millimeter in diameter.

Escaped particles 101 encounter collimator 106. Collimator 106 provides a highly directional beam of particles 103, the direction of which is toward surface 116. Collimator 106 is realized, in the illustrated embodiment, as two plates 108 and 110 that are spaced from one another such that slit 112 is defined therebetween. Other arrangements that provide a slit or other orifice operable to collimate the escaped particles 101 may suitably be used in place of plates 108 and 110.

In the illustrative embodiment, at least some of collimated particles 103 are excited by particle exciter 114. Upon leaving particle source 102 and passing collimator 106, particles 101/103 are at their ground state, |A>. Particle exciter 114 excites at least some of particles 103 to a higher energy state |B>. In some embodiments, particle exciter 114 is a source of electromagnetic radiation. And, in one specific embodiment, particle exciter 114 is a tunable laser that is advantageously tuned to the transition energy of the particles 103.

Excited particles 105 (and unexcited particles) approach surface 116. The surface is advantageously a material capable of being polished to a high degree of smoothness, such as, for example, gold. In various embodiments, surface 116 comprises a dielectric, a semiconductor and a conductor.

In the illustrative embodiments, surface 116 has a cylindrical shape, but in other embodiments, surfaces having arbitrary shapes, including irregular shapes, are suitable used. Regardless of its specific geometry, surface 116 advantageously allows a particle to make a "minimum distance" or "closest" approach (to the surface) and then allows the particle to escape without contact. For example, a spherical surface or cylindrical surface facilitates such a minimum distance approach or closest approach since there will be one location on the surface that protrudes further than others from the perspective of the particle's trajectory. That point is the location of the minimum distance or closest approach.

Since a flat surface (e.g., a plate) does not readily allow for a minimum distance approach and escape, it should not be used.

Recalling expression [1], excited particles 105 will experience a substantially larger van der Waals attraction to surface 116 than unexcited particles. At or near closest approach 118, excited particles 105 decay back to their ground state with the emission of photon γ. Decay to the ground state is caused by spontaneous decay, or via stimulated decay using optional particle de-exciter 120. The time for spontaneous decay can be predicted by those skilled in the art, so that spontaneous decay can be relied on to cause the required transition at or near closest approach.

In some embodiments, particle de-exciter stimulates decay by injecting additional energy into excited particles 105. In some embodiments, particle de-exciter 120 is a tunable laser.

After decay to the ground state, the van der Waals attraction between outbound decayed particles 107 and surface 116 is much less the van der Waals attraction between inbound excited particles 105 and surface 116. As a consequence, particles 107 will be traveling much faster after the interaction with surface 116 than they were when they first left particle source 102. The trajectory of particles 107 can be calculated using classical mechanics (i.e., scattering theory).

In the context of the present invention, the decay must occur "near closest approach" to the surface since van der Waals forces fall off rapidly with distance:

$$\text{force} = -K/R^4 \quad [2]$$

where

K is a constant; and

R is the distance between the particle and the surface

As used in this Specification, the term "near closest approach" or "near minimum distance," "near minimum approach" or "during interaction," when used in conjunction with a transition to or from the ground state, means that the particle is within a few micrometers (e.g., less than 5 micrometers), and advantageously within a few hundred angstroms of closest approach.

Note that the efficiency of the apparatus 100 is at its maximum when the transition occurs at closest approach. To the extent the transition occurs "near" closest approach, some amount of efficiency is lost. This is true whether the transition occurs near but before closest approach or near but after closest approach.

This result—this increase in speed—is not in conflict with the principle of conservation of energy. In particular, the energy of the electromagnetic radiation emitted by particle 105 as it decays is actually less than it originally absorbed. And the difference between the emitted energy and the absorbed energy is exactly equal to the increase in kinetic energy of the particle after its closest approach to surface 116.

Figure 2:
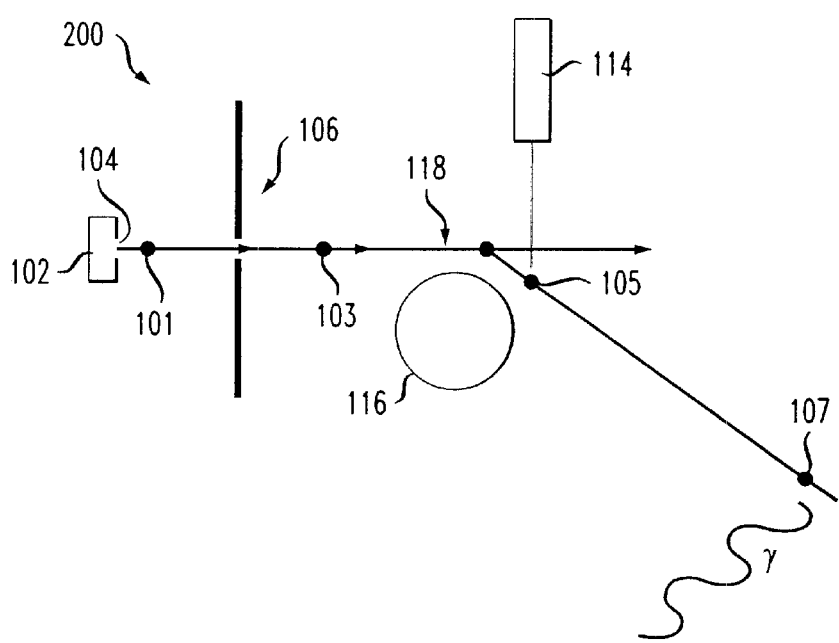
FIG. 2 depicts an illustrative embodiment of a particle decelerator in accordance with the present teachings.

With minor modifications that are described below in conjunction with FIG. 2, the apparatus and method described above is used to decelerate a particle. FIG. 2 depicts a particle decelerator in accordance with the present teachings.

Like particle accelerator 100, particle decelerator 200 comprises particle source 102, collimator 106, particle exciter 114 and surface 116, interrelated as shown. In decelerator 200, however, particle exciter 114 excites particles following but near closest approach 118, rather than before closest approach as in particle accelerator 100.

As in particle accelerator 100, ground state particles 101 exit particle source 102 through orifice 104 and are collimated by collimator 106. Collimated ground state particles 103 approach surface 116. After but near closest approach 118 to surface 116, at least some of particles 103 are excited by particle exciter 114. In some embodiments, particle exciter 114 is a source of electromagnetic radiation, such as, without limitation, a tunable laser that is advantageously tuned to the transition energy of the particles 103.

The van der Waals force between excited particles 105 and surface 116 is greater than the van der Waals force between inbound ground state particles 103 and surface 116. As a consequence, outbound excited particles 105 are moving substantially more slowly than inbound particles 103.

Excited particles 105 decay, at some point, back to their ground state with the emission of photon γ. Since the decay occurs far from closest approach, such decay has a de minimis effect on particle speed.

Figure 3:
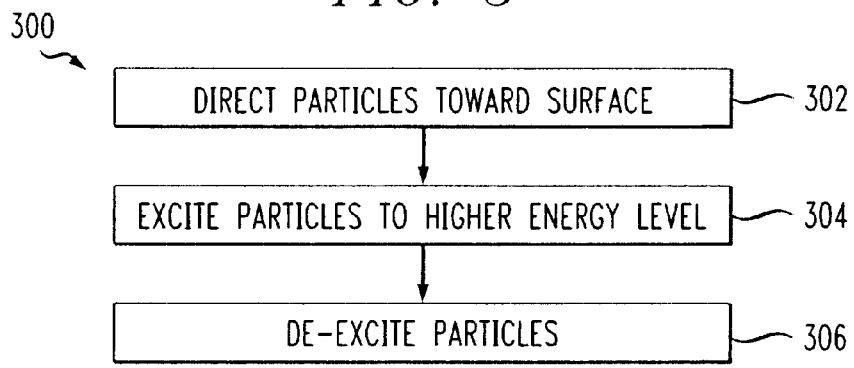
FIG. 3 depicts a first illustrative method for accelerating/decelerating particles in accordance with the present teachings.

FIG. 3 depicts an illustrative method 300 for accelerating particles, either positively (i.e., increasing speed) or negatively (i.e., decreasing speed), in accordance with the present teachings. In accordance with operation 302, particles are directed toward a surface, such as surface 116 (see FIGS. 1 and 2). In operation 304, at least some of the particles are excited to a higher energy level.

To function as a particle accelerator, operation 304 (i.e., exciting particles) is performed before closest approach with the surface. To cause deceleration, operation 304 is performed after but near closest approach with the surface.

In some embodiments, method 300 includes operation 306 wherein excited particles are de-excited, such as by injecting more energy into the particles.

Figure 4:
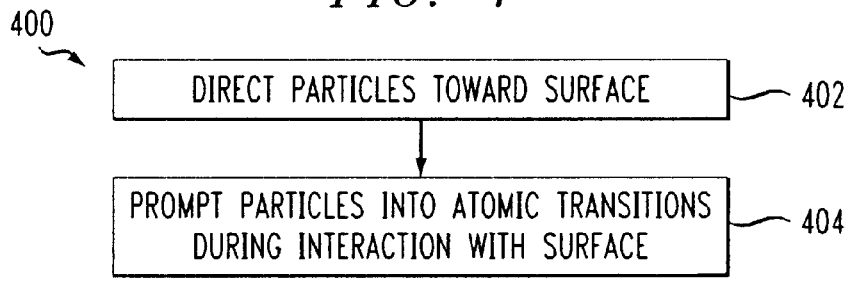
FIG. 4 depicts a second illustrative method for accelerating/decelerating particles in accordance with the present teachings.

FIG. 4 depicts an alternate embodiment of a method 400 for accelerating particles, either positively (i.e., increasing speed) or negatively (i.e., decreasing speed), in accordance with the present invention. In accordance with operation 402, particles are directed toward a surface, such as surface 116 (see FIGS. 1 and 2). In operation 404, at least some of the particles are prompted into atomic transitions during their interaction (i.e., near closest approach) with the surface.

When accelerating particles, operation 404 comprises, in some embodiments, exciting articles and then de-exciting particles, such as by the addition of energy. The step of de-exciting occurs near closest approach. When decelerating particles, operation 404 comprises exciting the articles after but near closest approach.

Figure 5:
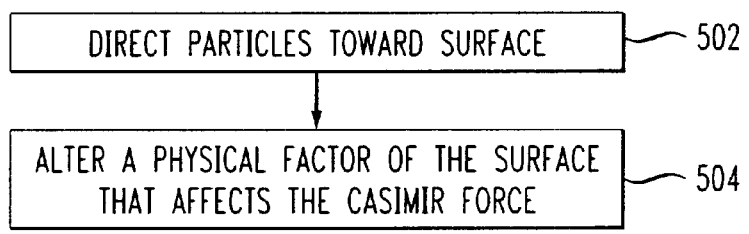
FIG. 5 depicts a third illustrative method for accelerating/decelerating particles in accordance with the present teachings.

Further embodiments of a method 500 for particle acceleration are described below in conjunction with FIG. 5.

In accordance with operation 502 of method 500, particles are directed to closest approach with a surface. In operation 504, when the particle is near closest approach to the surface, a physical factor of surface that affects a Casimir force between the particle and the surface is altered. Physical factors affecting the Casimir force include, without limitation, the concentration of free charge carrier in the surface and the dielectric properties of the material comprising the surface. See applicant's co-pending application Ser. No. 09/578,638 entitled "Method and Apparatus for Energy Extraction."

The material(s) comprising the surface are suitably selected as a function of the altered physical factor. For example, in an embodiment wherein the altered physical factor is the concentration of free charge carriers, the material is advantageously a semiconductor or compound semiconductor. Illustrative semiconductors (for embodiments wherein the altered physical factor is the concentration of free charge carriers) include, without limitation, silicon (Si), germanium (Ge), and compound semiconductors such as, without limitation, gallium arsenide (GaAs), indium gallium arsenide (InGaAs) and indium antimonide (InSb).

Moreover, in some embodiments, the surface comprises doped semiconductors and doped compound semiconductors, including, without limitation, phosphorus-doped silicon and indium antimonide that includes naturally occurring impurities. In some embodiments, dopants are selected based on their relative ease of ionization.

In embodiments in which the altered physical factor is the concentration of free charge carriers, alteration is effected in a variety of ways, including, without limitation, illuminating the surface with a laser, heating the surface, and injecting charge into the surface.

An example of the operation of method 500 is now described in an embodiment in which the altered physical factor is the concentration of free charge carriers and the manner in which the concentration is alter ed is by illuminating the surface with a laser.

In an embodiment of method 500 in which particles are accelerated, the surface is illuminated by laser before particles are near closest approach. As the particle is near closest approach, it is subjected to a relatively higher force of attraction due to a Casimir force than if the surface was not illuminated. This is due, in this embodiment, to the increase in the concentration of free charge carriers. At closest approach, or after but still near closest approach, illumination is decreased or terminated. This decreases the Casimir force so that particle departs at increased velocity.

To decelerate particles, the timing of illumination is simply reversed from the acceleration case. That is, the laser is turned on at closest approach, or after, but near closest approach. The Casimir force will therefore be greater between the particle and the surface when it is outbound from closest approach such that the particle is decelerated.

It will be appreciated that due to the timing issues involved in method 500, particles must be delivered to the surface in a pulsed fashion. In other words, illustrative method 500 can not be practiced using a continuous stream of particles.

In further embodiments, method 300 and method 500 can be used in conjunction with one another. In other words, in addition to affecting the transition near closest approach (i.e., method 300), the surface can be illuminated, etc. to use the Casimir force to accelerate or decelerate the particle, as well.

The present methods and apparatuses find utility in a variety of applications including, for example, particle heating and cooling devices, micro-propulsive systems, sensors and energy conversion devices.

It is to be understood that the above-described embodiments are merely illustrative of the invention and that many variations may be devised by those skilled in the art without departing from the scope of the invention and from the principles disclosed herein. It is therefore intended that such variations be included within the scope of the following claims and their equivalents.

I claim:

1. A method comprising:
   directing a plurality of particles toward a surface, wherein said surface is physically configured to allow said particles to approach said surface to a minimum distance but not contact said surface; and
   exciting at least some of said particles by exposing them to electromagnetic radiation.

2. The method of claim 1 wherein directing further comprises collimating said plurality of particles.

3. The method of claim 1 wherein exciting comprises exciting said at least some particles before closest approach to said surface.

4. The method of claim 3 further comprising de-exciting at least some of said particles at or near closest approach to said surface.

5. The method of claim 4 wherein de-exciting comprises exposing said particles to electromagnetic radiation suitable for causing decay to a ground state.

6. The method of claim 1 wherein exciting comprises exciting said at least some particles after but near closest approach to said surface.

7. A method comprising:
   directing a plurality of particles toward a surface, wherein said surface is physically configured to allow said particles to approach said surface to a minimum distance but not contact said surface; and
   prompting at least some of said particles into atomic transitions during their interaction with said surface.

8. The method of claim 7 wherein said step of prompting further comprises:
   exciting said at least some particles before approaching said minimum distance; and
   de-exciting at least some particles of the excited particles at or near said minimum distance.

9. The method of claim 7 wherein said step of prompting further comprises exciting said at least some particles after but near said minimum distance.

10. A method comprising:
    exciting a plurality of particles;
    directing said plurality of particles to a closest approach to a surface; and
    releasing a photon from at least some of said excited particles.

11. The method of claim 10 wherein said step of exciting occurs before said closest approach of said particles to said surface.

12. The method of claim 11 wherein said step of releasing a photon comprises releasing said photon at or near said closest approach to said surface.

13. The method of claim 10 wherein said step of exciting occurs after but near said closest approach of said particles to said surface.

14. An article comprising:
    a particle source;
    a particle exciter to excite at least some particles exiting said particle source; and
    a surface having a physical configuration suitable for allowing a minimum distance approach of said particles to said surface.

15. The apparatus of claim 14 wherein said device that directs particles comprises a collimator.

16. The apparatus of claim 14 further comprising a particle de-exciter.

17. The apparatus of claim 14 wherein said surface is curved.

18. The apparatus of claim 14 wherein said particle exciter comprises a tunable laser.

19. The apparatus of claim 14 wherein said particle exciter excites said some particles before near closest approach to said surface.

20. The apparatus of claim 14 wherein said particle exciter excites said some particles after closest approach but near said closest approach.

21. A propulsion device comprising:

a surface;

first electromagnetic energy source for exciting particles by exposing them to electromagnetic radiation, wherein said particles are moving toward a part of said surface but not into contact with said surface, wherein, at said part, said particles make their closest approach to said surface; and a second electromagnetic energy source for de-exciting particles by exposing them to electromagnetic radiation, wherein, when de-excited, said particles are near closest approach to said surface.

22. The propulsion device of claim 21 wherein said first electromagnetic energy source is a laser.

23. The propulsion device of claim 21 further comprising a particle source.

24. The propulsion device of claim 23 wherein said particle source is outer space.

25. A method comprising altering a physical factor of a surface when a particle is near closest contact with said surface, wherein said altered physical factor affects a Casimir force between said surface and said particle, and wherein said physical factor is altered by a technique selected from the group consisting of applying energy to said surface, changing an amount of energy applied to said surface, withdrawing energy from said surface, and changing an amount of energy withdrawn from said surface.

26. The method of claim 25 wherein altering a physical factor comprises illuminating said surface.

27. The method of claim 26 wherein altering further comprises:

illuminating said surface before said particle is near closest contact;

decreasing said illumination when said particle is at closest contact, or after but near closest contact.

28. The method of claim 26 wherein altering further comprises illuminating said surface when said particle is at closest contact, or after but near closest contact.

* * * * *